US012691554B2

(12) United States Patent
Gottschling et al.

(10) Patent No.: US 12,691,554 B2
(45) Date of Patent: *Jul. 28, 2026

(54) SHEAR WRENCH TOOL

(71) Applicant: BLACK & DECKER INC., New Britain, CT (US)

(72) Inventors: Rafael Gottschling, Idstein (DE); Michael Kunz, Idstein (DE); Philipp Libera, Taunusstein (DE); Benjamin Schmidt, Idstein (DE)

(73) Assignee: BLACK & DECKER INC.

( * ) Notice: Subject to any disclaimer, the term of this patent is extended or adjusted under 35 U.S.C. 154(b) by 435 days.

This patent is subject to a terminal disclaimer.

(21) Appl. No.: 18/298,566

(22) Filed: Apr. 11, 2023

(65) Prior Publication Data

US 2024/0082991 A1 Mar. 14, 2024

(30) Foreign Application Priority Data

Sep. 13, 2022 (GB) .................................... 2213333

(51) Int. Cl.
*B25B 21/00* (2006.01)
*B25B 23/147* (2006.01)

(52) U.S. Cl.
CPC .......... *B25B 21/002* (2013.01); *B25B 23/147* (2013.01)

(58) Field of Classification Search
CPC ..... B25B 21/00; B25B 21/002; B25B 23/147; B25B 23/1415
See application file for complete search history.

(56) References Cited

U.S. PATENT DOCUMENTS 5,953,965 A 9/1999 Kaneyama et al.
7,086,483 B2 * 8/2006 Arimura ................. B25B 21/00 173/180
7,090,030 B2 * 8/2006 Miller ..................... B25F 5/026 173/217
7,950,309 B2 * 5/2011 Junkers .................. B25B 21/00 81/55
8,796,976 B2 * 8/2014 Kusakawa ............ B25B 23/147 318/434

(Continued)

FOREIGN PATENT DOCUMENTS

JP H08216046 A 8/1996
JP H11873 A 1/1999

(Continued)

OTHER PUBLICATIONS

Extended EP Search Report Dated Jan. 26, 2024, cited in corresponding EP Patent Application No. 23166649.6.

(Continued)

*Primary Examiner* — David B. Thomas
(74) *Attorney, Agent, or Firm* — Jordan IP Law, LLC; Todd A. Vaughn

(57) ABSTRACT

A shear wrench tool including a motor; a transmission operatively connected to the motor; a first socket arranged to engage a tip of a bolt to be sheared; and a second socket arranged to engage a nut threaded on the bolt; wherein the first and second sockets are operatively connected to the transmission and rotate in opposite directions relative to each other when the motor provides a torque to the transmission; and wherein the motor can be driven in both forwards and reverse directions.

13 Claims, 8 Drawing Sheets

(56) References Cited

U.S. PATENT DOCUMENTS

| | | | | |
|---|---|---|---|---|
| 8,928,261 | B2 * | 1/2015 | Haga | B25B 21/002 318/400.01 |
| 9,114,519 | B2 * | 8/2015 | Iwata | B25B 23/1475 |
| 9,233,457 | B2 * | 1/2016 | Wanek | B25B 23/141 |
| 9,882,452 | B2 * | 1/2018 | Haga | H02K 11/33 |
| 10,099,353 | B2 * | 10/2018 | Nishimiya | B25F 5/001 |
| 10,668,612 | B2 * | 6/2020 | Saur | B25B 23/147 |
| 10,821,581 | B2 * | 11/2020 | Lee | B25B 23/147 |
| 11,267,109 | B2 * | 3/2022 | Banba | B25B 21/00 |
| 11,358,260 | B2 * | 6/2022 | Libera | B23D 29/02 |
| 11,518,007 | B2 * | 12/2022 | Libera | B25B 21/002 |
| 11,524,393 | B2 * | 12/2022 | Libera | B25B 13/488 |
| 11,707,776 | B2 * | 7/2023 | Ikuta | B21J 15/105 29/243.53 |
| 12,017,311 | B2 * | 6/2024 | Junkers | B25B 21/00 |
| 12,042,909 | B2 * | 7/2024 | Fujimoto | B25B 23/14 |
| 2004/0226728 | A1 * | 11/2004 | Boeni | B25D 11/005 173/176 |
| 2011/0162860 | A1 * | 7/2011 | Gut | B25F 5/001 173/1 |
| 2012/0103643 | A1 * | 5/2012 | Binder | B25F 5/001 173/1 |
| 2017/0043457 | A1 * | 2/2017 | Tsuge | B25F 5/00 |
| 2017/0157752 | A1 | 6/2017 | Nishimiya et al. | |
| 2018/0304453 | A1 * | 10/2018 | Schaer | B25F 5/001 |
| 2021/0069888 | A1 * | 3/2021 | Hairul | H01H 9/06 |
| 2021/0078153 | A1 * | 3/2021 | Sunabe | H02P 29/0027 |
| 2023/0148339 | A1 * | 5/2023 | Fortoloczki | B25B 23/147 81/469 |
| 2024/0082992 | A1 * | 3/2024 | Gottschling | B25B 23/1415 |

FOREIGN PATENT DOCUMENTS

| | | | | | |
|---|---|---|---|---|---|
| JP | 2016010832 | A | * | 1/2016 | B25B 23/153 |
| WO | 2015095425 | A2 | | 6/2015 | |
| WO | WO-2015156170 | A1 | * | 10/2015 | B25B 21/00 |
| WO | 2016002293 | A1 | | 1/2016 | |
| WO | WO-2016002292 | A1 | * | 1/2016 | B25F 5/001 |

OTHER PUBLICATIONS

GB Search Report dated Mar. 3, 2023 cited in corresponding GB Patent Application No. GB2213333.4.

* cited by examiner

SHEAR WRENCH TOOL

CROSS-REFERENCE TO RELATED APPLICATIONS

This application claims priority from GB Patent Application No. 2213333.4, filed Sep. 13, 2022, the disclosures of which is incorporated herein by reference in its entirety.

FIELD OF THE INVENTION

The disclosure relates to a shear wrench tool.

BACKGROUND OF THE INVENTION

In some worksites tension control bolts are used to fasten two workpieces together, for example, steel joints in heavy construction. During a fastening operation a nut and a tension control bolt are threadably tightened until a tip shears from the tension control bolt when a predetermined fastening torque is exceeded. When a user commences such a fastening operation with a shear wrench tool the user cannot remove the shear wrench tool from the tension control bolt and nut until the tip has been sheared due to friction occurring between the shear wrench tool and the parts of the tension control bolt and nut which are engaged by the tool. This can be problematic if the user initiates a fastening operation when the workpiece is in the wrong position because the position of the workpiece cannot be adjusted after the tension control bolt is fully tightened.

BRIEF SUMMARY OF THE INVENTION

According to the present invention there is provided a shear wrench tool. Such a tool can be used to tighten a nut on a tension control bolt without shearing the tip of the bolt and then remove the tool from the nut and bolt combination, whereby a user can install a workpiece in place using a plurality of tension control bolts and check that the workpiece is in the correct position before permanently fixing the workpiece in place. Naturally if the workpiece is not in the correct position the nuts can be loosened on the tension control bolts to enable workpiece adjustment. When the workpiece is in the correct position the user can fix it permanently in place by tightening the nuts on the tension control bolts and shearing the tips of the tension control bolts.

Optional features of the shear wrench tool are defined in the dependent claims.

BRIEF DESCRIPTION OF THE DRAWINGS

Various aspects and examples of the invention will now be described by way of non-limiting example with reference to the accompanying drawings, in which.

DETAILED DESCRIPTION OF THE PREFERRED EMBODIMENT

Figure 1:
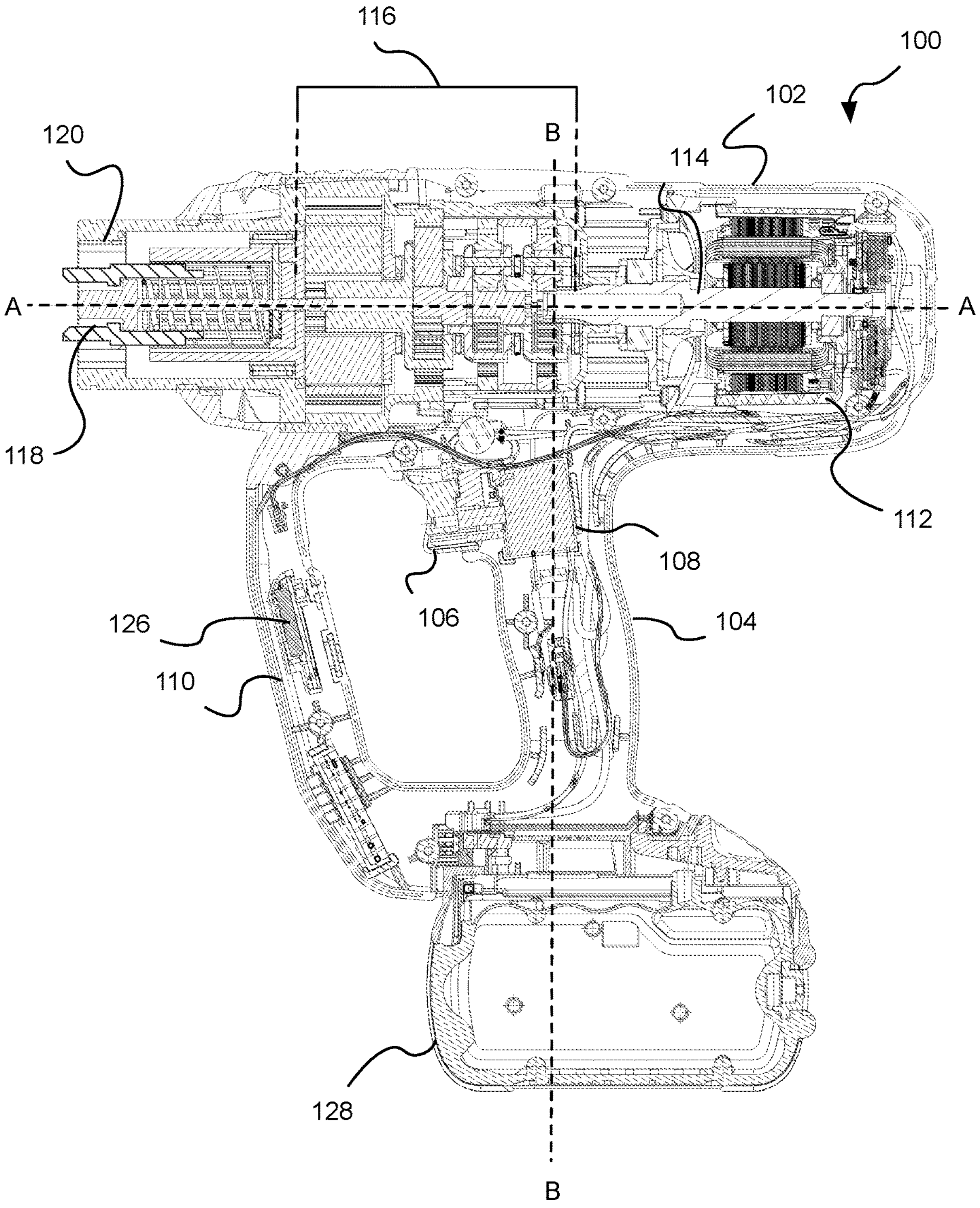
FIG. 1 shows a cross-sectional side view of a shear wrench tool according to an example.

FIG. 1 shows a side cross-sectional view of a shear wrench tool 100. The shear wrench tool 100 is a power tool suitable for tightening a tension control bolt 200 and cooperating nut 202 as shown in FIG. 2.

Figure 2:
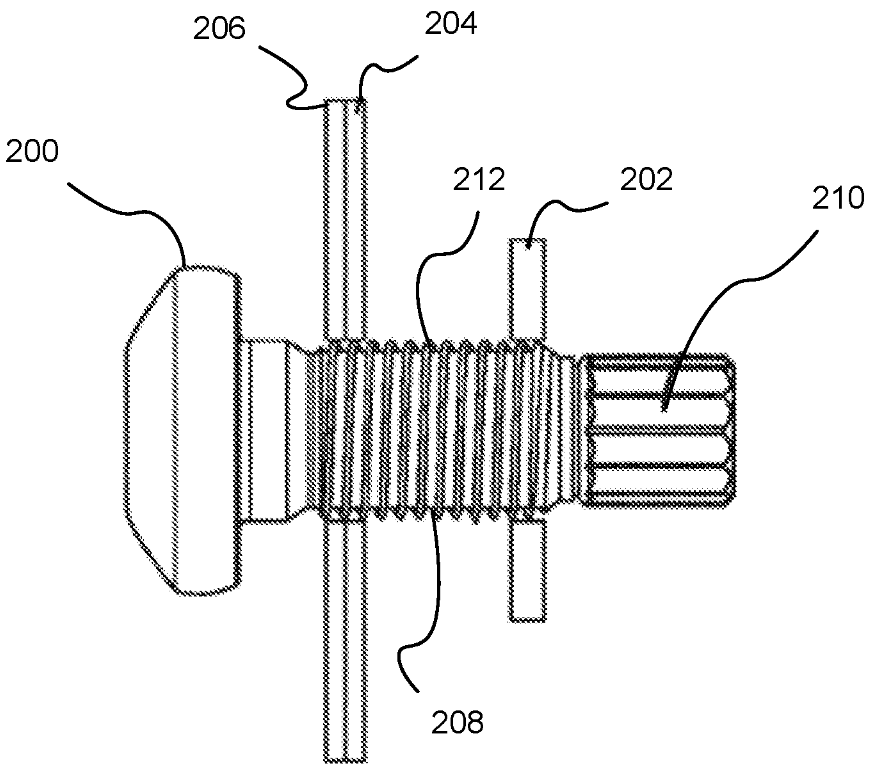
FIG. 2 shows a side view of a bolt and a nut for use with a shear wrench tool according to an example.

FIG. 2 shows a side view of the bolt 200 and nut 202 for use with the shear wrench tool 100. The bolt 200 and nut 202 as shown in FIG. 2 are used to fasten a first workpiece 204 and a second workpiece 206 at a predetermined torque. The bolt 200 comprises bolt body portion 208 and a shearable tip 210. The nut 202 is threaded on a threaded shaft 212 of the bolt body portion 208. The tip 210 shears from the bolt body portion 208 when the shear wrench tool 100 exerts a predetermined torque when tightening the nut 202 on the bolt 200. The dimensions of the bolt 200 can be varied to adjust the torque at which the tip 210 shears from the bolt body portion 208. The shear wrench tool 100 tightens the nut 202 on the bolt 200 by simultaneously exerting a torque in opposite directions on the bolt 200 and the nut 202. The operation of the shear wrench tool 100 will be discussed in more detail below.

The shear wrench tool 100 comprises a housing 102 which has a clam-shell type construction. The housing 102 extends along a first longitudinal axis A-A. The housing 102 comprises a primary handle 104 for the user to grip during use. The primary handle 104 extends in a direction substantially perpendicular to the first longitudinal axis A-A along a second longitudinal axis B-B. A trigger 106 is located in the primary handle 104 and is arranged to actuate a trigger switch 108 when the user squeezes the trigger 106. The housing 102 comprises a secondary handle 110 for the user to also grip during use.

A DC brushless motor 112 is mounted in the housing 102 and is electrically connected to a removeable battery pack 128. The battery pack 128 is connected to the housing 102 on the primary handle 104. The battery pack 128 is mechanically mounted via an electrical and mechanical connection. The battery pack 128 is known and will not be discussed in any further detail.

A controller 126 is mounted in the housing 102 and the controller 126 is electrically connected to motor 112 and the battery pack 128. The controller 126 is configured to issue control signals to the motor 112 to control the speed and direction of the motor 112. In particular the controller 126 interacts with control circuitry of the DC brushless motor 112 for controlling operation of the motor 112. The controller 126 mounted on a printed circuit board and fastened to the housing 102. It will be appreciated by persons skilled in the art that there is freedom to select an appropriate location of the controller 126 within the shear wrench tool 100.

The motor 112 comprises an output drive shaft 114. The output drive shaft 114 is operatively connected to a transmission 116. The transmission 116 in turn is operatively connected to a first socket 118 and a second socket 120. In this way, the transmission 116 transmits a torque provided by the motor 112 to the first and second sockets 118, 120.

The first socket 118 is engageable with the tip 210 of the bolt 200 and rotates in a first direction when the motor 112 is operated in use. The second socket 120 is engageable with the nut 202 and rotates in an opposite direction to the first socket 118 when the motor 112 is operated in use. When the tip 210 of the bolt 200 has been sheared from the bolt body portion 208, the tip 210 remains in the first socket 118 until it is removed such as by being ejected from the first socket 118 by an ejection mechanism of the tool 100.

The transmission 116 comprises a plurality of operatively coupled planetary and sun gears in order to generate a high torque at the first and second sockets 118, 120. The configuration of a transmission 116 suitable for transferring torque between the motor 112 and the first and second sockets 118, 120 will be apparent to a person skilled in the art; for example, a suitable transmission is the transmission 24 described in EP 3 831 532 A1 the contents of which are incorporated herein by reference. The transmission 116 can comprise any suitable gearing between the output drive shaft 114 of the motor and the first and second sockets 118, 120 to transmit torque therebetween.

When the first and second sockets 118, 120 respectively engage the bolt 200 and the nut 202 during use, the torque exerted by the first and second sockets 118, 120 is high. This means that the frictional forces between the first socket 118 and the bolt 200 and the second socket 120 and the nut 202 are sufficiently high to prevent the user from removing the shear wrench tool 100 from the bolt 200 and nut 202. Due to factors including the motor 112 comprising permanent magnets and friction experienced by the gearing of the transmission 116, this means that the user is not able to manually reverse the direction of the first and second sockets 118, 120.

In previous shear wrench tools after commencing a fastening operation the user may only release the shear wrench tool from a bolt 200 and a nut 202 by shearing the tip 210 from the bolt body portion 208. However, in some circumstances, the user may want to only partly tighten the nut 202 against the bolt 200. That is, the user does not want to always shear the tip 210 from the bolt 200 when tightening the nut 202. For example, the user may desire to insert multiple bolts 200 into the first and second workpieces 204, 206 and ensure correct alignment of the workpieces before fully tightening the bolts 200 and nuts 202. By not fully tightening the nuts 202 and bolts 200 the user can easily move the first workpiece 204 with respect to the second workpiece 206, including unfastening a nut 202 from a bolt 200 to enable this adjustment, to ensure the correct position of the first and second workpieces 204, 206.

In this way, the shear wrench tool 100 is operable in a pre-shear mode whereby the shear wrench tool 100 fastens the bolt 200 and the nut 202 without shearing the tip 210 from the bolt body portion 208. Operation of the shear wrench tool 100 in the pre-shear mode will now be discussed in further detail with respect to FIGS. 3 and 4.

Figure 3:
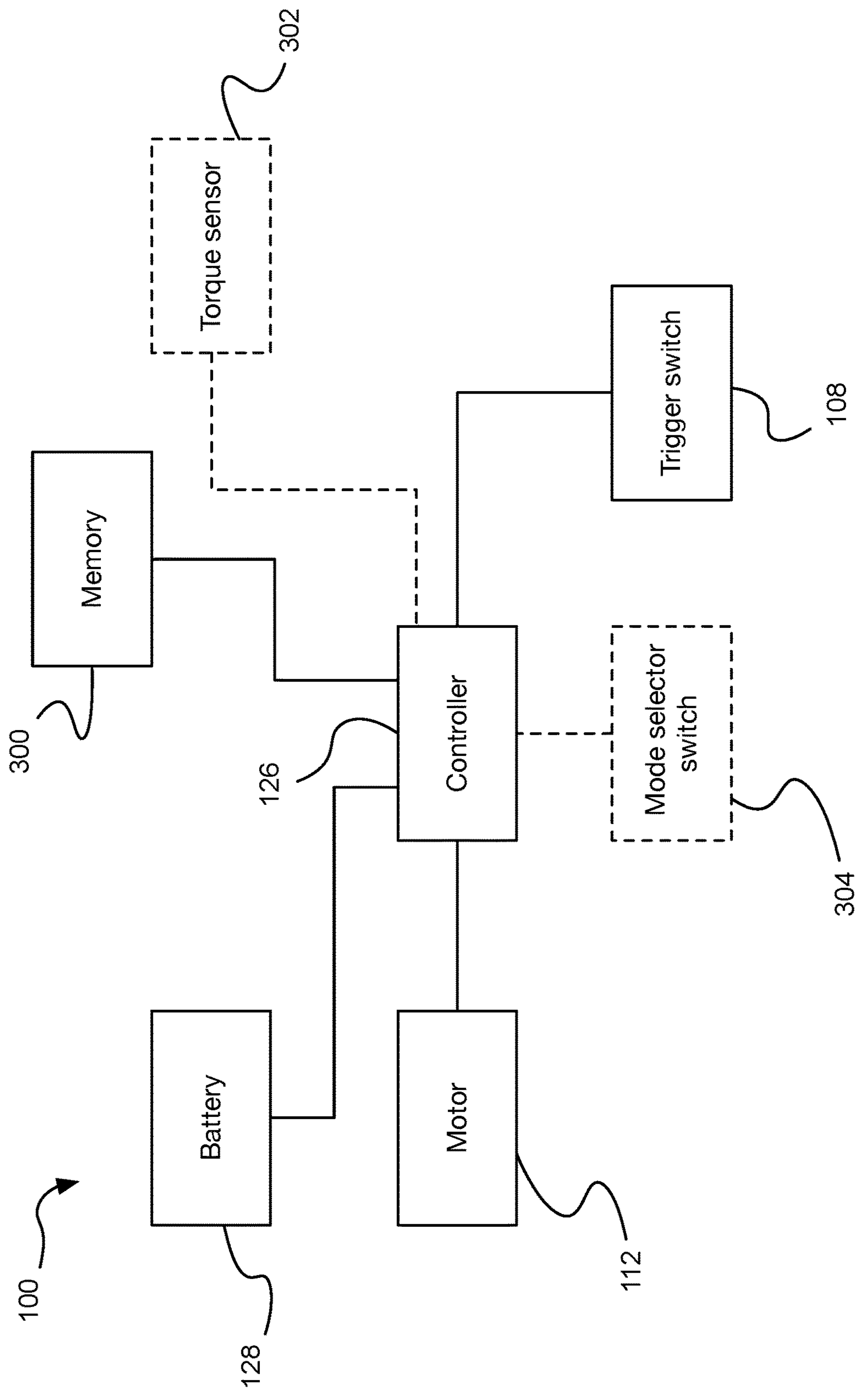
FIG. 3 shows a schematic view of a shear wrench tool according to an example.

FIG. 3 shows a schematic drawing of the shear wrench tool 100. The controller 126 is connected to a memory 300 for storing operational parameters of the shear wrench tool 100. The trigger switch 108 is connected to the controller 126 which is configured to receive a signal from the trigger switch 108 when the trigger 106 is actuated. Some of the features of the shear wrench tool 100 as shown in FIG. 3 are optional and are shown with dotted lines. The optional features will be described in further detail below in subsequent examples.

Figure 4:
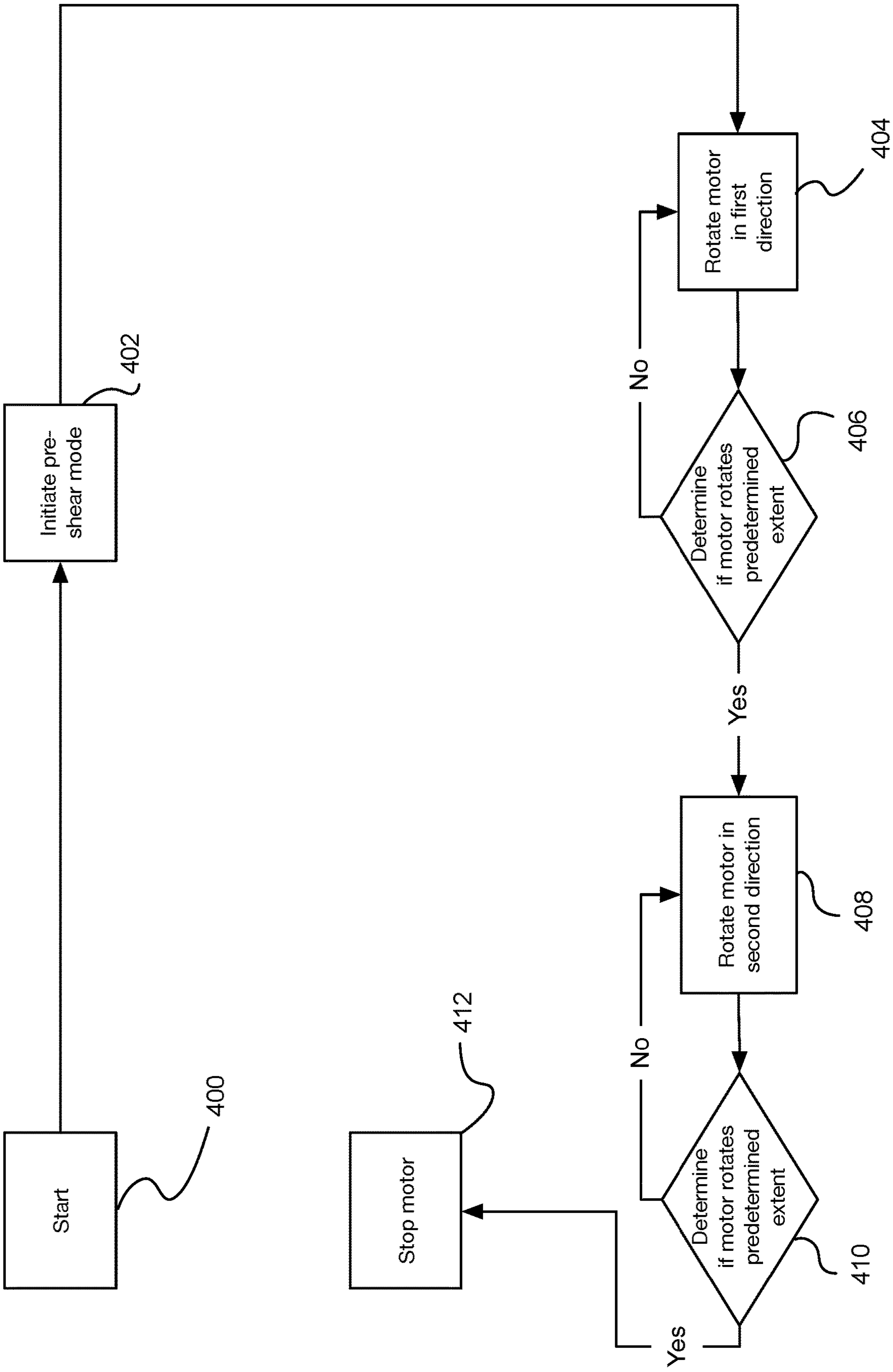
FIGS. 4 to 8 show flow diagrams of operation of a shear wrench tool according to various examples.

FIG. 4 shows a flow diagram of a first example of the shear wrench tool 100 operating in the pre-shear mode.

At step 400, the operation of the shear wrench tool 100 starts. The operation of the shear wrench tool 100 is started by the user squeezing the trigger 106. The trigger 106 then closes trigger switch 108 and the controller 126 receives the signal from the trigger switch 108.

The controller 126 then initiates the shear wrench tool 100 to operating in the pre-shear mode as shown in step 402. This means that the controller 126 prevents the shear wrench tool 100 from shearing the tip 210 of the bolt 200 from the bolt body portion 208.

The controller 126 then issues a control signal to the motor 112 to rotate in a first direction as shown in step 404. As mentioned above, this transmits a torque via the transmission 116 to the first socket 118 and the second socket 120. The first and second sockets 118, 120 rotate in first opposing directions for tightening the nut 202 on the bolt 200.

The controller 126 continues to control the motor 112 to rotate in the first direction. Whilst the motor 112 rotates in the first direction, the controller 126 determines in step 406 whether the motor 112 has rotated in the first direction equal to a predetermined extent. The predetermined extent of rotation of the motor 112 in the first direction is a threshold number of motor turns. The threshold number of motor turns in the first direction is stored in the memory 300.

The threshold number of motor turns in the first direction is selectively predetermined depending on the circumstances such as the properties of the bolt 200 and nut 202 to be used, the thickness of the objects 204, 206 being fastened together and the extent of play between the objects 204, 206 which is needed to achieve pre-shear functionality. The threshold number of motor turns in the first direction can be changed and thereby selected so that the shear wrench tool 100 will not fully tighten the bolt 200 and nut 202 in the pre-shear mode. In other words the tool 100 stores multiple sets of data in the memory 300 associating respective threshold numbers of motor turns with different types of data (such as different types of bolt and nut combinations, thicknesses of objects 204, 206 being fastened and required degrees of play between such objects 204, 206 needed to achieve pre-shear functionality), meaning that a user can select the appropriate threshold number of motor turns based on the required effect.

The threshold number of motor turns in the first direction corresponds to a torque which is not great enough to shear the tip 210 from the bolt body portion 208. This means that as the controller 126 keeps the number of motor turns below the threshold number of motor turns in the first direction in the pre-shear mode, the bolt 200 and nut 202 will not be fully tightened.

On a negative determination by the controller 126 in step 406, namely that the number of motor turns is below the threshold number of motor turns in the first direction, the controller 126 continues to rotate the motor 112 in the first direction.

On a positive determination by the controller 126 in step 406, namely that the number of motor turns is equal to or above the threshold number of motor turns in the first direction, the controller 126 stops the motor 112 rotating in the first direction.

In step 406, the controller 126 determines the extent of the rotation of the motor 112 in different ways. In the first example shown in FIG. 4, the controller 126 determines the extent of the motor rotation by counting the number of turns of the motor 112 makes in the pre-shear mode. The controller 126 can receive a signal from the motor 112 corresponding to the number of turns that the motor 112 has made. The concept of counting motor turns is known and suitable techniques for counting motor turns of the motor 112 of the shear wrench tool 100 will be apparent to persons skilled in the art. The controller 126 receives information from the control circuitry of the motor 112 which is indicative of motor turn information. Such information received from the control circuitry of the motor 112 can be directly indicative of motor turn information, whereas in other embodiments the controller 126 derives motor turn information based on the information received from the motor control circuitry.

Once the controller 126 has stopped the motor 112 in the first direction, the controller 126 issues a control signal to rotate the motor 112 in a second direction as shown in step 408. The second direction of the motor 112 is the reverse direction to the first direction. This transmits a torque via the transmission 116 to the first socket 118 and the second socket 120. The first and second sockets 118, 120 rotate in second opposing directions. However, in the pre-shear mode, the motor 112 does not rotate in the second direction for a sufficient number of turns to remove the nut 202 from the bolt 200. Instead, the motor 112 rotates a predetermined extent in the second direction to release the first and second sockets 118, 120 from the bolt 200 and the nut 202.

Accordingly, the reverse rotation of the motor 112 and the transmission 116 mean that the frictional forces between the first and second sockets 118, 120 and the bolt 200 and the nut 202 is reduced so that a user can remove the tool 100 from the snugly tightened but unsheared bolt 200 and nut 202. To enable this the predetermined extent to which the first and second sockets 118, 120 should rotate relative to each other in the reverse direction ranges in some embodiments between 1 and 16 degrees; it will however be appreciated that in other embodiments this range may be different and is dependent on the nature of the cooperating surfaces between the first and second sockets 118, 120 and the nut 202 and the tip 210 of the bolt 200. Changes in the shape of such features which are in contact with each other in use changes the extent to which the first and second sockets 118, 120 are required to be rotated relative to each other in order to reduce friction between the first and second sockets 118, 120 and the nut 202 and the tip 210 of the bolt 200 to such an extent that a user can pull the shear wrench tool 100 away from an unsheared bolt 200. For example, if there is a large degree of play between cooperating surfaces of the second socket 120 and the nut 202 then the first and second sockets 118, 120 will need to be rotated further relative to each other to implement pre-shear functionality compared to if there is a smaller degree of play between such cooperating surfaces of the second socket 120 and the nut 202.

Whilst the motor 112 rotates in the second direction, the controller 126 determines in step 410 whether the motor 112 has rotated by a predetermined extent. The predetermined extent of rotation of the motor 112 is a threshold number of motor turns stored in the memory 300. The threshold number of motor turns in the second direction is dependent on the nature of the transmission 116, namely the overall gear ratio between the input and output sections of the transmission 116, meaning there is some freedom in the specific number of the threshold number of motor turns selected for implementing step 410 however the threshold number of motor turns selected should be enough to merely release the first and second sockets 118, 120 from the bolt 200 and the nut 202 such that a user can pull the tool 100 from the snugly tightened but unsheared bolt 200 and nut 202. In other words, the threshold number of motor turns selected should be enough to cause the first and second sockets 118, 120 to rotate in the reverse direction relative to each other to the aforementioned predetermined extent.

On a negative determination by the controller 126 in step 410, namely that the number of motor turns is below the threshold number of motor turns in the second direction, the controller 126 continues to rotate the motor 112 in the second direction.

On a positive determination by the controller 126 in step 410, namely that the number of motor turns is equal to or above the threshold number of motor turns in the second direction, the controller 126 stops the motor 112 rotating in the second direction as shown in step 412.

Once the motor 112 has stopped rotating in the second direction, the shear wrench tool 100 can be removed from the bolt 200 and the nut 202.

Figure 5:
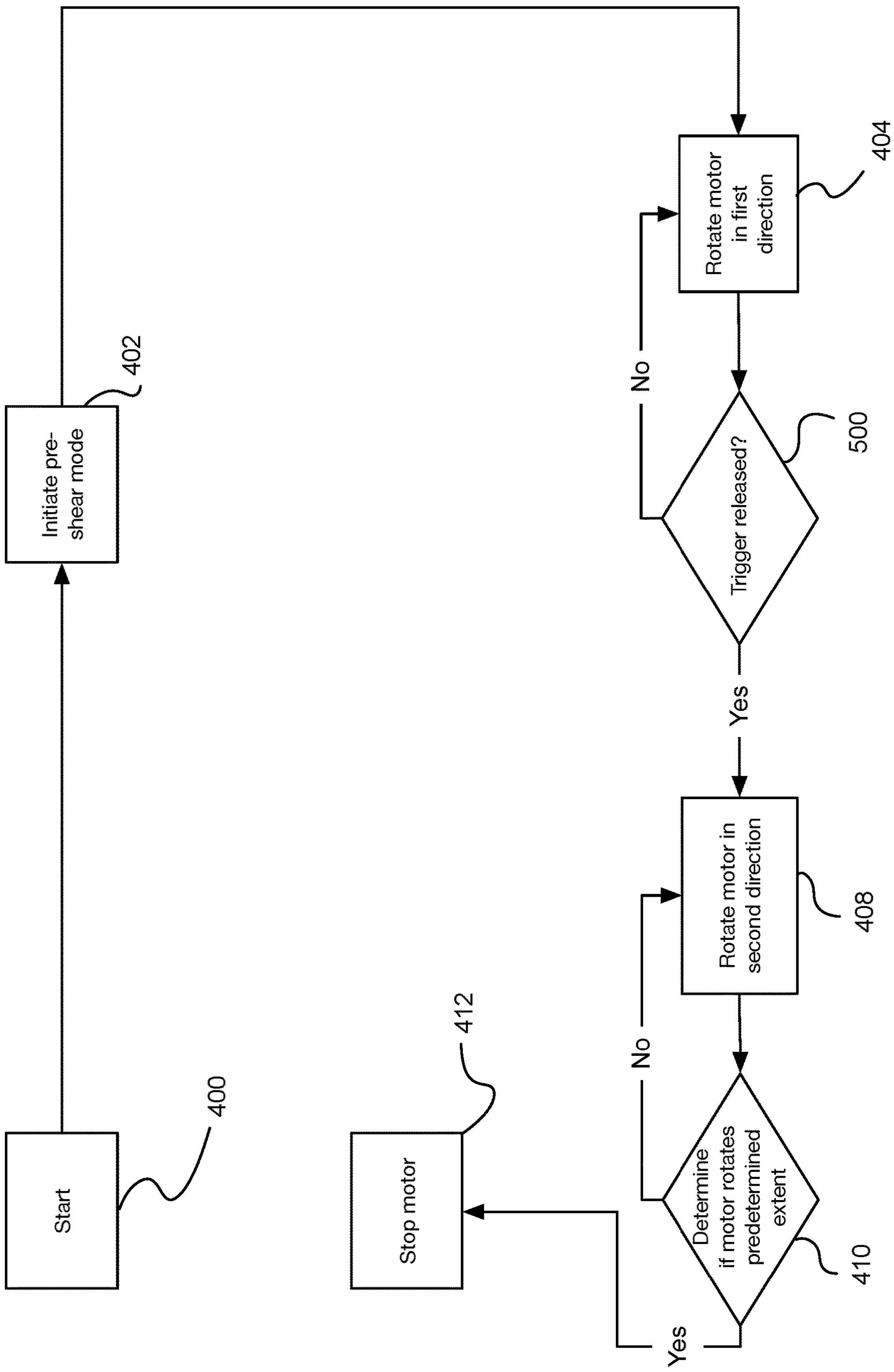

FIG. 5 shows another example of a flow diagram of operation of another shear wrench tool 100 in pre-shear mode. FIG. 5 is the same as shown in FIG. 4 except that controller 126 determines that the motor 112 has rotated in the first direction equal to a predetermined extent in a different way.

In this case, step 406 has been replaced with step 500. In this step, the controller 126 determines whether the user has released the trigger 106 in the pre-shear mode. When the user releases the trigger 106 in the pre-shear mode, the user decides when the bolt 200 and the nut 202 are tight enough. For example, the user can feel or hear when the shear wrench tool 100 has sufficiently tightened the bolt 200 and the nut 202 without shearing the tip 210.

On a negative determination by the controller 126 in step 500, namely that the user has not released the trigger 106, the controller 126 continues to rotate the motor 112 in the first direction in step 404.

On a positive determination by the controller 126 in step 500, namely that the user has released the trigger 106, the controller 126 stops the motor 112 rotating in the first direction and continues to step 408 as before.

Figure 6:
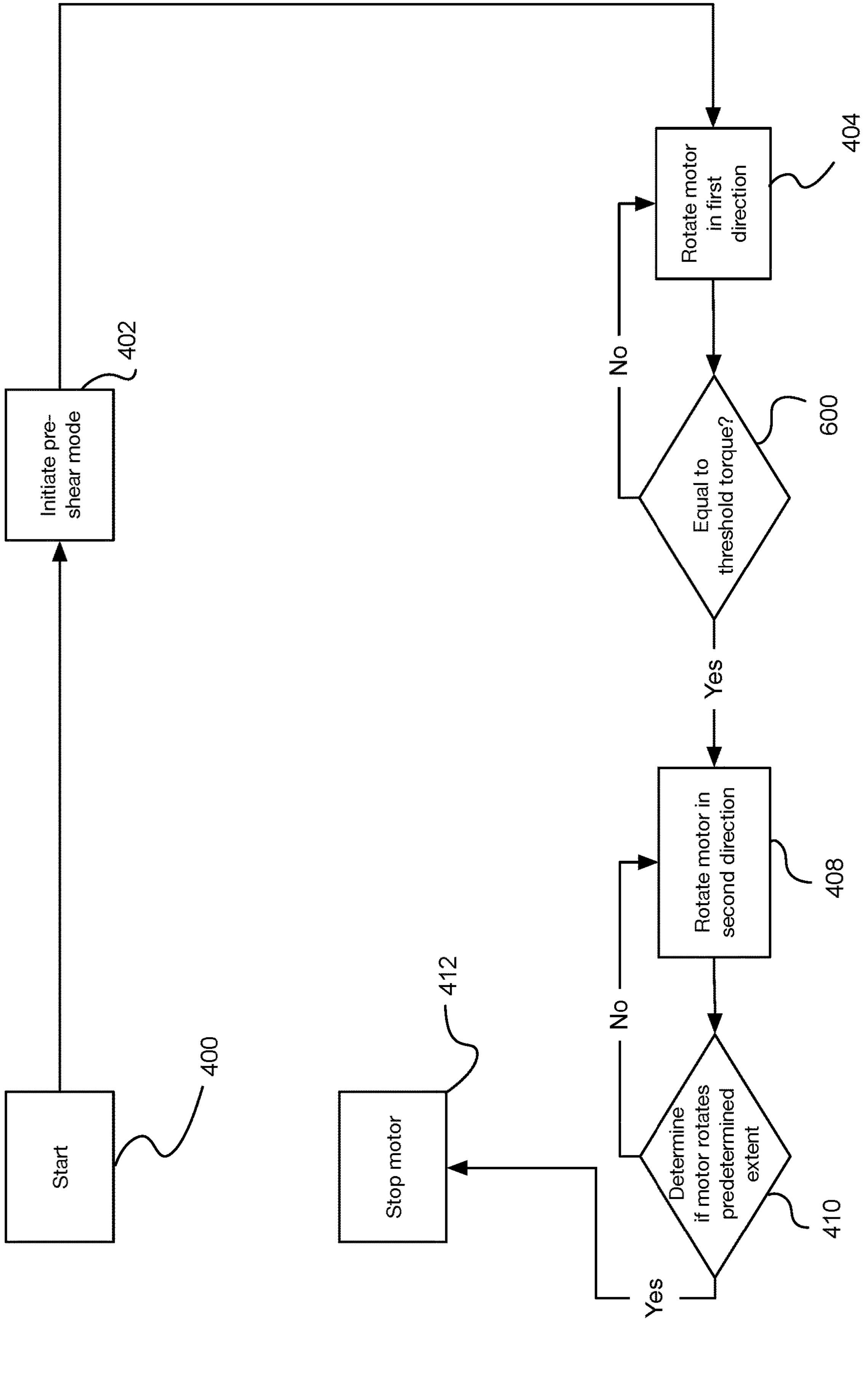

Another example is shown in FIG. 6 which shows another example of a flow diagram of operation of another shear wrench tool 100 in pre-shear mode. FIG. 6 is the same as shown in FIG. 4 except that controller 126 determines that the motor 112 has rotated in the first direction equal to a required extent in a different way.

In this case, step 406 has been replaced with step 600. In this step, the controller 126 determines whether the torque of the motor 112 is equal to a predetermined torque threshold.

The controller 126 continues to control the motor 112 to rotate in the first direction. Whilst the motor 112 rotates in the first direction, the controller 126 determines in step 600 whether the motor 112 is providing a torque equal to a predetermined torque threshold. The torque generated by the motor 112 is proportional to the torque provided by the first and second sockets 118, 120 to the nut 202 and bolt 200 wherein the predetermined torque threshold is selected such that the torque output by the tool 100 is below the torque needed to shear the tip 210. Tool 100 stores multiple sets of data in the memory 300 associating respective threshold torque values with different types of data (such as different types of bolt and nut combinations, thicknesses of objects 204, 206 being fastened and required degrees of play between such objects 204, 206 needed to achieve pre-shear functionality), meaning that a user can select the appropriate threshold torque value based on the required effect.

On a negative determination by the controller 126 in step 600, namely that the torque provided by the motor 112 is below the predetermined torque threshold, the controller 126 continues to rotate the motor 112 in the first direction in step 404.

On a positive determination by the controller 126 in step 600, namely that the torque provided at the motor 112 is at least equal to the predetermined torque threshold, the controller 126 stops the motor 112 rotating in the first direction and continues to step 408 as before. It will be appreciated that during fastening of the nut 202 onto the bolt 200 when the workpieces being fastened begin to be squeezed by the nut 202 and bolt 200 the output torque of the tool 100 increases, whereby the torque generated by the motor 212 increases and it is when the torque generated by the motor 212 reaches the threshold torque amount that the tool 100 determines the nut 202 has been snugly tightened onto the bolt 200.

The controller 126 is connected to a torque sensor 302 which is operatively coupled to the output drive shaft 114 of the motor 112. This means that the controller 126 can determine the torque provided by the motor 112 during operation.

Figure 7:
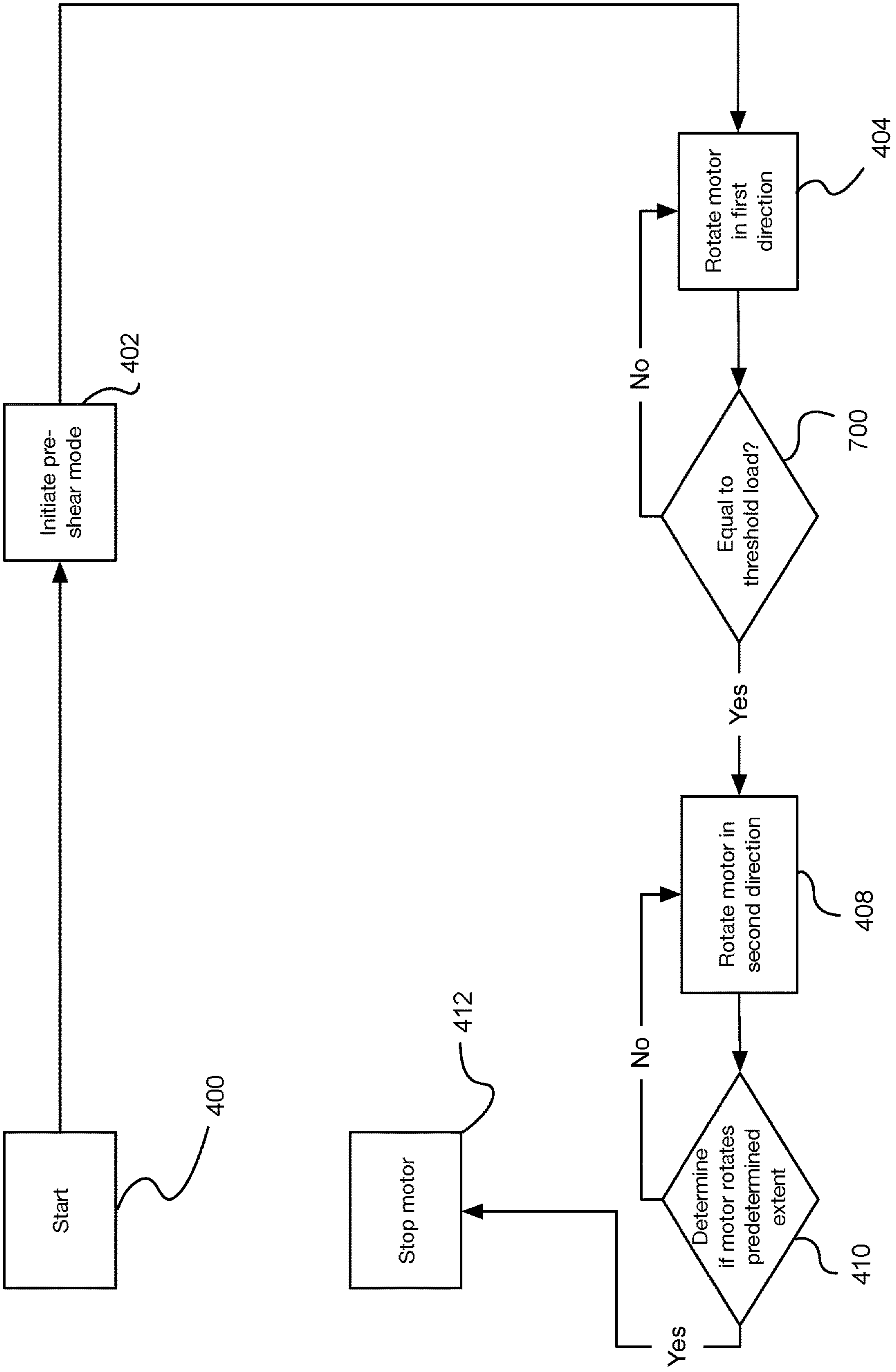

Another example is shown in FIG. 7 which shows another example of a flow diagram of operation of another shear wrench tool 100 in pre-shear mode. FIG. 7 is the same as shown in FIG. 4 except that controller 126 determines that the motor 112 has rotated in the first direction equal to a required extent in a different way.

In this case, step 406 has been replaced with step 700. In this step, the controller 126 determines whether the load of the motor 112 is equal to a predetermined load threshold.

The predetermined load threshold corresponds to a load of the motor 112 when the first and second sockets 118, 120 snugly tighten the nut 202 on the bolt 200 but do not shear the tip 210 from the bolt body portion 208. The controller 126 determines the load on the motor 112 based on the motor current and/or the motor voltage. The load of the motor 112 is proportional to the torque provided by the first and second sockets 118, 120 to the nut 202 and bolt 200 wherein the predetermined load threshold is selected such that the torque output by the tool 100 is below the torque needed to shear the tip 210. Tool 100 stores multiple sets of data in the memory 300 associating respective threshold motor load threshold values with different types of data (such as different types of bolt and nut combinations, thicknesses of objects 204, 206 being fastened and required degrees of play between such objects 204, 206 needed to achieve pre-shear functionality), meaning that a user can select the appropriate motor load threshold value based on the required effect.

On a negative determination by the controller 126 in step 700, namely that the load of the motor 112 is below the predetermined motor load, the controller 126 continues to rotate the motor 112 in the first direction in step 404.

On a positive determination by the controller 126 in step 700, namely that the load of the motor 112 is at least equal to the predetermined motor load, the controller 126 stops the motor 112 rotating in the first direction and continues to step 408 as before. It will be appreciated that during fastening of the nut 202 onto the bolt 200 when the workpieces being fastened begin to be squeezed by the nut 202 and bolt 200 the output torque of the tool 100 increases, whereby the power consumed by the motor 212 increases and it is when the load of the motor 212 reaches the threshold load value that the tool 100 determines the nut 202 has been snugly tightened onto the bolt 200.

Figure 8:
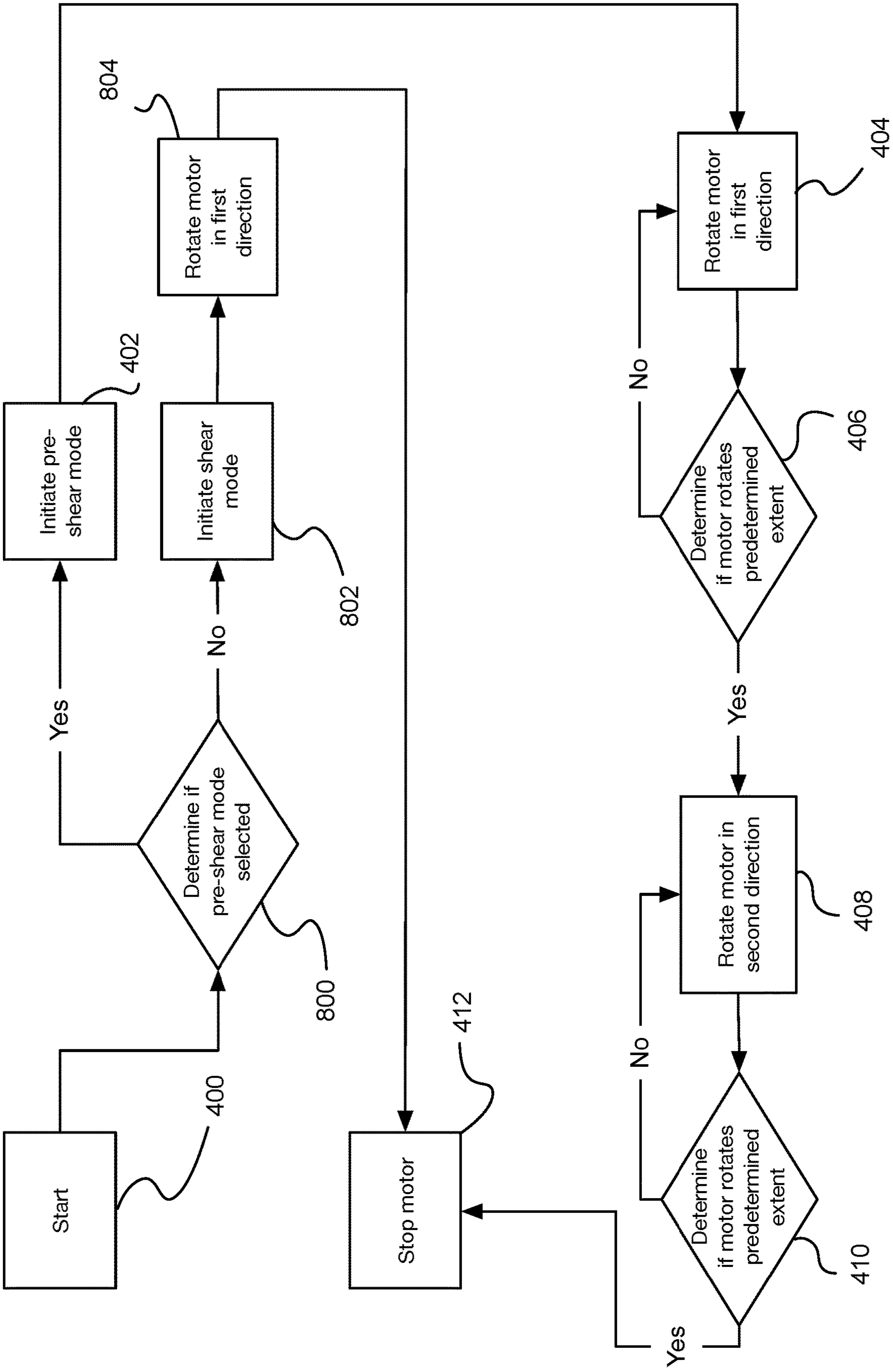

Another example is shown in FIG. 8 which illustrates a flow diagram of operation of another shear wrench tool 100. FIG. 8 is the same as shown in FIG. 4 except that the shear wrench tool 100 can be selectively operated in either a pre-shear mode or a shear mode. The steps of the pre-shear mode have been previously discussed with reference to FIG. 4. The shear mode of the shear wrench tool 100 is a mode of operation whereby the shear wrench tool 100 fastens the bolt 200 and the nut 202 to the extent that it shears the tip 210 from the bolt body portion 208.

The shear wrench tool 100 comprises a mode selector 304 for manually selecting between the pre-shear mode and the shear mode. The mode selector 304 is a slider switch mounted on the housing 102 and is configured to transmit a signal to the controller 126. Accordingly, the controller 126 can determine the selected mode from the position of the mode selector 304.

After the shear wrench tool 100 has been initiated in step 400 by pulling the trigger 106, the controller 126 determines whether the pre-shear mode is selected as shown in step 800.

In a first scenario, the mode selector 304 is in a first configuration corresponding to the pre-shear mode. The mode selector 304 sends a signal to the controller 126 corresponding to the selection of the pre-shear mode. Accordingly, the controller 126 in step 800 determines that the pre-shear mode is selected and the controller 126 continues to initiate the pre-shear mode in step 402 as before; wherein step 406 can be replaced with any of steps 500, 600 and 700 as heretofore described.

In a second scenario, the mode selector 304 is in a second configuration corresponding to the shear mode. The mode selector 304 sends a signal to the controller 126 corresponding to the selection of the shear mode. Accordingly, the controller 126 in step 800 determines that the shear mode is selected and the controller 126 initiates the shear mode as shown in step 802.

The controller 126 then issues a control signal to the motor 112 to rotate in the first direction as shown in step 804. The motor 112 continues to rotate in the first direction until a user releases the trigger 106 upon manually determining that the tip 210 of the bolt 200 is sheared from the bolt body portion 208 and the controller 126 stops the motor 112 in step 412.

In another example, the mode selector 304 is a button which the user depresses to select the pre-shear mode. In this example, the controller 126 will default to initiating the shear mode in step 802 unless the mode selector 304 is depressed. This means that the shear wrench tool 100 will default to a normal shear mode unless the user actively selects the pre-shear mode.

In another example the mode selector 304 is optional and the step 800 as shown in FIG. 8 is optional. In this case, the controller 126 automatically selects the pre-shear mode or the shear mode without the user actuating a slider switch or depressing a button. For example, the controller 126 can automatically power up in a pre-shear mode and the controller 126 can operate in the pre-shear mode until the user releases the trigger 106 for a first time. On detection of the user squeezing the trigger 106 again within a predetermined time frame, the controller 126 operates the shear wrench tool 100 in the shear mode. If the user waits longer than the predetermined time frame before pulling the trigger 106 again then the process starts again and the tool will remain in pre-shear mode.

In the foregoing embodiments the pre-shear functionality has been computer controlled, however, it is envisaged that in other embodiments pre-shear functionality can be manually controlled. In such an embodiment the shear wrench tool 100 in FIG. 1 has a feature which can be manipulated by a user for indicating to the controller 126 whether to run the motor 112 forwards or backwards upon pulling of the trigger 106. Such a feature may be a slide switch which causes the generation of a signal indicative to the controller 126 of whether the motor 112 should run forwards or backwards upon pulling of the trigger 106 depending on the position of the slide switch. Alternatively a button can be provided which when depressed causes the generation of a signal indicative to the controller 126 that the motor 112 should run forwards upon pulling of the trigger 106 and then when depressed again causes the generation of a signal indicative that the motor 112 should run backwards upon pulling of the trigger 106, whereby subsequent pushes of the button indicate to the controller 126 whether to run the motor 112 forwards or backwards upon pulling the trigger

106; the user can thus control the motor 112 to run forwards or backwards by pushing the button.

To implement manual pre-shear functionality the user selects that the motor 112 should run forwards. The user then commences a fastening operation in the normal manner firstly by engaging the first and second sockets 118, 120 with the tip 210 of a bolt 200 and a nut 202 and secondly by pulling the trigger 106 of the shear wrench tool 100. The user decides when the bolt 200 and the nut 202 are tight enough and releases the trigger 106 to stop the motor 112. For example, the user can feel or hear when the shear wrench tool 100 has sufficiently tightened the bolt 200 and the nut 202 around workpieces 204, 206 without shearing the tip 210.

Subsequently the user selects that the motor 112 should run backwards e.g. by using the aforementioned slide switch or button to indicate to the controller 126 that the motor 112 should run in reverse upon pulling of the trigger 106. The user then pulls the trigger 106 for driving the first and second sockets 118, 120 in the opposite direction to that in which they were driven during tightening. At the same time the user pulls the shear wrench tool 100 away from the bolt 200 and nut 202. When the first and second sockets 118, 120 have rotated in reverse direction far enough relative to each other the friction between the first and second sockets 118, 120 and the nut 202 and the tip 210 of the bolt 200 will have been reduced to such an extent that the user can pull the shear wrench tool 100 away from the unsheared bolt 200. The user then releases the trigger 106.

The shear wrench tool 100 may be able to implement computer controlled pre-shear mode functionality and/or manual pre-shear mode functionality in which case a feature is provided which can be manipulated by a user (e.g. a button) for indicating to the controller 126 whether or not manual pre-shear mode functionality is selected.

Some other shear wrench tools 100 do not have a feature for indicating to the controller 126 to run the motor 112 forwards or backwards. On the contrary the motor 112 is always caused to run in the same direction. The first and second sockets 118, 120 are caused to selectively rotate in a first direction relative to each other and in a second direction relative to each other due to a feature of the transmission which, when in a first position causes the first and second sockets 118, 120 to rotate in a first direction relative to each other and when in a second position causes the first and second sockets 118, 120 to rotate in a second direction relative to each other. A slidable feature for manipulation by a user may be provided, which is operatively coupled to said feature of the transmission, to selectively cause the first and second sockets 118, 120 to rotate in the first or second direction relative to each other. A suitable way of achieving this functionality will be apparent to persons skilled in the art.

It will be appreciated that whilst various aspects and examples have heretofore been described the scope of the present invention is not limited thereto and instead extends to encompass all arrangements, and modifications and alterations thereto, which fall within the spirit and scope of the appended claims.

For instance, whilst illustrative examples have been described as employing software it will be appreciated by persons skilled in the art that the functionality provided by such software may instead be provided by hardware (for example by one or more application specific integrated circuits), or indeed by a mix of hardware and software.

In general, the functionality described in connection with the controller 126 may be implemented in hardware or special purpose circuits, software, logic, or any combination thereof. For example, some aspects may be implemented in hardware while other aspects may be implemented in firmware or software which may be executed by the controller 126, microprocessor or other computing device although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or by the controller 126 or other computing devices or some combination thereof.

The examples of this disclosure may be implemented by computer software executable by a data processor or by hardware or by a combination of software and hardware. The data processing may be provided by means of one or more data processors. Further in this regard it should be noted that any blocks of the logic flow as in the Figures may represent program steps, or interconnected logic circuits, blocks and functions, or a combination of program steps and logic circuits, blocks and functions.

The memory 300 may be of any type suitable to the local technical environment and may be implemented using any suitable data storage technology, such as semiconductor based memory devices, magnetic memory devices and systems, optical memory devices and systems, fixed memory, and removable memory. Also, the controller 126 may be of any type suitable to the local technical environment, and may include one or more of general purpose microprocessors, digital signal processors (DSPs) or processors based on multi core processor architecture as non-limiting examples.

Some examples of the disclosure may be implemented as a chipset, in other words a series of integrated circuits communicating among each other. The chipset may comprise microprocessors arranged to run code, application specific integrated circuits (ASICs), or programmable digital signal processors for performing the operations described above.

The motor 112 has been described as being a DC brushless motor and the controller 126 cooperates with the brushless motor (in particular with its control electronics) in order to control the brushless motor and determine motor status information e.g. number of motor turns. In other embodiments however the motor 112 may be a brushed motor having a motor output shaft driven by a stator and having at least one magnet on the motor output shaft. For the controller 126 to determine motor turn information of such a brushed motor the tool 100 additionally has at least one motor sensor for generating output indicative of motor turn information; such as at least one Hall sensor which cooperates with the at least one magnet on the motor output shaft and which generates output indicative of variations in magnetic flux density as the motor shaft rotates which can be used by the controller 126 to determine motor turn information e.g. number of motor turns. Since the concept of determining motor turn information in the context of brushed and brushless motors is already known there is freedom for a designer to select an appropriate way of determining motor turn information when designing a shear wrench tool 100 which implements the invention described herein.

In battery operated embodiments of the shear wrench tool 100 the motor 112 (whether brushed or brushless) is configured to operate using DC current whereas in mains operated embodiments the motor is configured to operate using AC current.

What is claimed is:

1. A shear wrench tool comprising:

a motor operable to be driven in a forward direction and a reverse direction;

a transmission operatively connected to the motor;

a first socket arranged to engage a tip of a bolt to be sheared;

a second socket arranged to engage a nut threaded on the bolt; and a user manipulatable portion operable to selectively cause the motor to operate in the forward direction or the reverse direction, wherein the first socket and the second socket are operatively connected to the transmission and rotate in opposite directions relative to each other when the motor provides a torque to the transmission.

2. The shear wrench tool of claim 1, wherein a user can manually control the extent to which the first socket and the second socket rotate in a first direction relative to each other in use and the extent to which the first socket and the second socket rotate in a second direction relative to each other in use.

3. The shear wrench tool of claim 1, further comprising a controller for controlling the tool to implement pre-shear mode functionality whereby in use the motor rotates in the forward direction such that the first socket and the second socket tighten the bolt and nut on an object without shearing the tip of the bolt and the motor subsequently rotates a predetermined extent in the reverse direction for causing the first socket and the second socket to rotate in the opposite direction relative to each other.

4. The shear wrench tool of claim 3, wherein the controller causes the motor to reverse the rotational direction from the forward direction to the reverse direction when the controller determines the motor has rotated in the forward direction by a predetermined number of motor turns.

5. The shear wrench tool of claim 3, wherein the controller is configured to reverse the motor direction from the forward direction to the reverse direction when the controller determines that a user releases a trigger switch when the motor is operating in the pre-shear mode.

6. The shear wrench tool of claim 3, wherein a torque sensor is configured to output information indicative of the output torque generated by the motor when the motor rotates in the forwards direction and the controller is configured to reverse the motor direction from the forward direction to the reverse direction based on the information generated by the torque sensor.

7. The shear wrench tool of claim 3, wherein the controller is configured to monitor the load of the motor, optionally the current consumed by the motor, and is configured to reverse the motor direction from the forward direction to the reverse direction based on the monitored load of the motor.

8. The shear wrench tool of claim 3, wherein the motor stops rotating in the reverse direction when the motor has rotated in the reverse direction a threshold number of motor turns.

9. The shear wrench tool of claim 3, wherein the motor stops rotating in the reverse direction when the first socket and the second socket have been rotated relative to each other by a predetermined rotational extent.

10. The shear wrench tool of claim 9, wherein the predetermined rotational extent ranges between 1 to 16 degrees.

11. The shear wrench tool of claim 3, wherein the tool can operate in either the pre-shear mode or a shear mode, wherein in the shear mode the motor rotates in the forward direction in use such that the first socket and the second socket tighten the nut and bolt and shear the tip of the bolt.

12. The shear wrench tool of claim 11, wherein the shear wrench tool comprises a mode selector input configured to enable a user to selectively cause the tool to operate in the pre-shear mode or the shear mode.

13. The shear wrench tool of claim 1, wherein the motor is a brushless DC motor.

* * * * *